(12) United States Patent
Martinez et al.

(10) Patent No.: US 10,021,842 B2
(45) Date of Patent: Jul. 17, 2018

(54) IRRIGATION CONTROLLERS WITH ENHANCED ALTERNATING CURRENT SWITCHING DEVICES

(71) Applicant: Rain Bird Corporation, Azusa, CA (US)

(72) Inventors: Martin Castaneda Martinez, El Cajon, CA (US); Angel Reyes Archundia, Tijuana (MX)

(73) Assignee: Rain Bird Corporation, Azusa, CA (US)

( * ) Notice: Subject to any disclaimer, the term of this patent is extended or adjusted under 35 U.S.C. 154(b) by 1068 days.

(21) Appl. No.: 13/843,845

(22) Filed: Mar. 15, 2013

(65) Prior Publication Data

US 2014/0277782 A1     Sep. 18, 2014

(51) Int. Cl.
*A01G 25/16*     (2006.01)

(52) U.S. Cl.
CPC .................................. *A01G 25/162* (2013.01)

(58) Field of Classification Search
CPC ................ A01G 25/126; A01G 25/162; Y10T 137/1866; G05B 2219/2625
See application file for complete search history.

(56) References Cited

U.S. PATENT DOCUMENTS

| | | | | |
|---|---|---|---|---|
| 4,016,458 A | * | 4/1977 | Everhart | H02H 9/04 361/18 |
| 4,215,382 A | * | 7/1980 | Davis | A01G 25/162 361/166 |
| 5,162,963 A | * | 11/1992 | Washburn | H02M 1/14 361/111 |
| 5,748,466 A | * | 5/1998 | McGivern | G05B 19/0423 239/63 |
| 6,664,742 B2 | * | 12/2003 | Venkatraman | H05B 41/295 315/116 |

(Continued)

OTHER PUBLICATIONS

STMicroelectronics; "A logic-level transient-voltage protected AC switch"; AN1172 Application Note; May 2006; 23 Pages; STMicroelectronics.

(Continued)

*Primary Examiner* — Thomas C Lee
*Assistant Examiner* — Tri T Nguyen
(74) *Attorney, Agent, or Firm* — Fitch, Even, Tabin & Flannery LLP

(57) ABSTRACT

Some embodiments provide irrigation controllers, comprising: a transformer configured to step down a voltage producing an AC power signal; a live AC line and an AC common line coupled with the transformer; a plurality of AC switches coupled with the live AC line and configured to selectively pass the AC power signal to one or more valve solenoids such that the one or more valve solenoids are effectively coupled across the live AC line and the AC common line; an impedance element coupled serially on the AC common line with the transformer, wherein the impedance element comprises an inductive reactance and a resistive component, and the impedance element is configured to increase overvoltage protection between the transformer and the plurality of AC switches increasing an effective voltage tolerance to the overvoltage conditions at the AC switches; and a controller configured to selectively control the plurality of AC switches.

19 Claims, 6 Drawing Sheets

(56) References Cited

U.S. PATENT DOCUMENTS

2011/0267732 A1* 11/2011 Kuo ...................... H02H 9/042
361/104
2012/0187934 A1* 7/2012 Suzuki .................. H02M 3/158
323/311
2013/0147589 A1* 6/2013 Johnson ................ H01F 27/022
336/96

OTHER PUBLICATIONS

STMicroelectronics; "Z01 and ACS behavior compared under fast voltage transients"; AN1379 Application Note; Jun. 2010; 10 Pages; STMicroelectronics.
STMicroelectronics; "AC Swtiches"; Printed Mar. 8, 2013; 1 page; http://www.st.com/web/en/catalog/sense_power/FM144/CL1208.

* cited by examiner

RESULTS

|  | Without Impedance ST-COM | | With Impedance ST-COM | | Without Impedance ST-GND | | With Impedance ST-GND | |
| --- | --- | --- | --- | --- | --- | --- | --- | --- |
|  | ON MAX | OFF MAX | ON MAX | OFF MAX | ON MAX | OFF MAX | ON MAX | OFF MAX |
| Mod 1 | 2 KV | 2 KV | 6 KV | 6 KV | 4 KV | 4 KV | 5 KV | 5 KV |
| Mod 2 | 2 KV | 2 KV | 8 KV | 8 KV | 5 KV | 5 KV | 8 KV | 8 KV |

*FIG. 6*

| Test point | | Mod 1 with AC Switch | | Mod 2 with AC Switch | |
| --- | --- | --- | --- | --- | --- |
|  |  | Without Wirewound Resistor | With Wirewound Resistor | Without Wirewound Resistor | With Wirewound Resistor |
| Mod 2 | Sta Vs. Com. | 2500 | 5000 | NA | NA |
| Mod 1 | Sta Vs. Com. | NA | NA | 2500 | 5000 |
| Mod 2 | Sta Vs. GND | 5000 | 7000 | NA | NA |
| Mod 1 | Sta Vs. GND | NA | NA | 4000 | 6000 |

*FIG. 7*

IRRIGATION CONTROLLERS WITH ENHANCED ALTERNATING CURRENT SWITCHING DEVICES

BACKGROUND

1. Field of the Invention

The present invention relates generally to irrigation systems, and more specifically to irrigation controllers.

2. Discussion of the Related Art

Generally, irrigation controllers are used to control the delivery of water to irrigation devices connected to switchable irrigation valves. To control the delivery of water to groups of irrigation devices that define irrigation stations or zones, conventional program-based irrigation controllers typically provide programs that are used by the irrigation controller to activate one or more valves.

The cost to manufacture many of these irrigation controllers continues to rise as a result of assembly and costs of components. Further, the cost is often increased because of the addition protections that are employed to protect the irrigation controller and/or components of the irrigation controller from power surges and/or overvoltages, for example, cause from lightning strikes.

SUMMARY OF THE INVENTION

Several embodiments of the invention advantageously address the needs above as well as other needs by providing irrigation controllers that comprise: a live AC line and an AC common line wherein the live AC line receives an AC power signal, defined across the live AC line and the AC common line, having a voltage usable within the irrigation controller; a plurality of AC switching devices coupled with the live AC line, wherein the plurality of AC switching devices are configured to selectively pass the AC power signal to one or more valve solenoids to control irrigation valves such that the one or more valve solenoids are effectively coupled across the live AC line and the AC common line; an impedance element coupled serially on the AC common line with the transformer, wherein the impedance element comprises an inductive reactance and a resistive component and the impedance element is configured to increase overvoltage protection of at least the plurality of AC switching devices increasing an effective voltage tolerance to the overvoltage conditions at the AC switching devices; and a controller configured to selectively control the plurality of AC switching devices in selectively allowing the AC power signal to pass through one or more of the AC switching devices to power the respective one or more valve solenoids.

Other embodiments provide irrigation controllers, comprising: a controller configured to implement and control irrigation at a site; a plurality of AC switches coupled to receive an AC power signal, wherein the AC switches are further coupled with the controller and are controlled by the controller, wherein the controller is configured to selectively activate one or more of the plurality of AC switches to pass the AC power signal to one or more valve solenoids to control irrigation valves in implementing the irrigation; wherein each of the plurality of AC switches comprise integrated protection circuitry that provide some additional internal surge protection for the AC switches; and wherein the plurality of AC switches have at least a first rating corresponding to intended operating parameters of the AC switches while a first level of protection for at least the AC switches is achieved, wherein the first rating is less than a second rating corresponding to surge protection of other AC switches that would have otherwise been incorporated into the irrigation controller to achieve the first level of protection when the AC switches are not incorporated.

BRIEF DESCRIPTION OF THE DRAWINGS

The above and other aspects, features and advantages of several embodiments of the present invention will be more apparent from the following more particular description thereof, presented in conjunction with the following drawings.

FIG. 6 shows a table presenting representative test results of tolerances to 20 rapidly repeated voltage surges applied to a switching device of an irrigation controller in accordance with some embodiments.

FIG. 7 shows a table presenting representative test results of tolerances to 20 rapidly repeated voltage surges to station modules that incorporate AC switches, in accordance with some embodiments.

Figure 1:
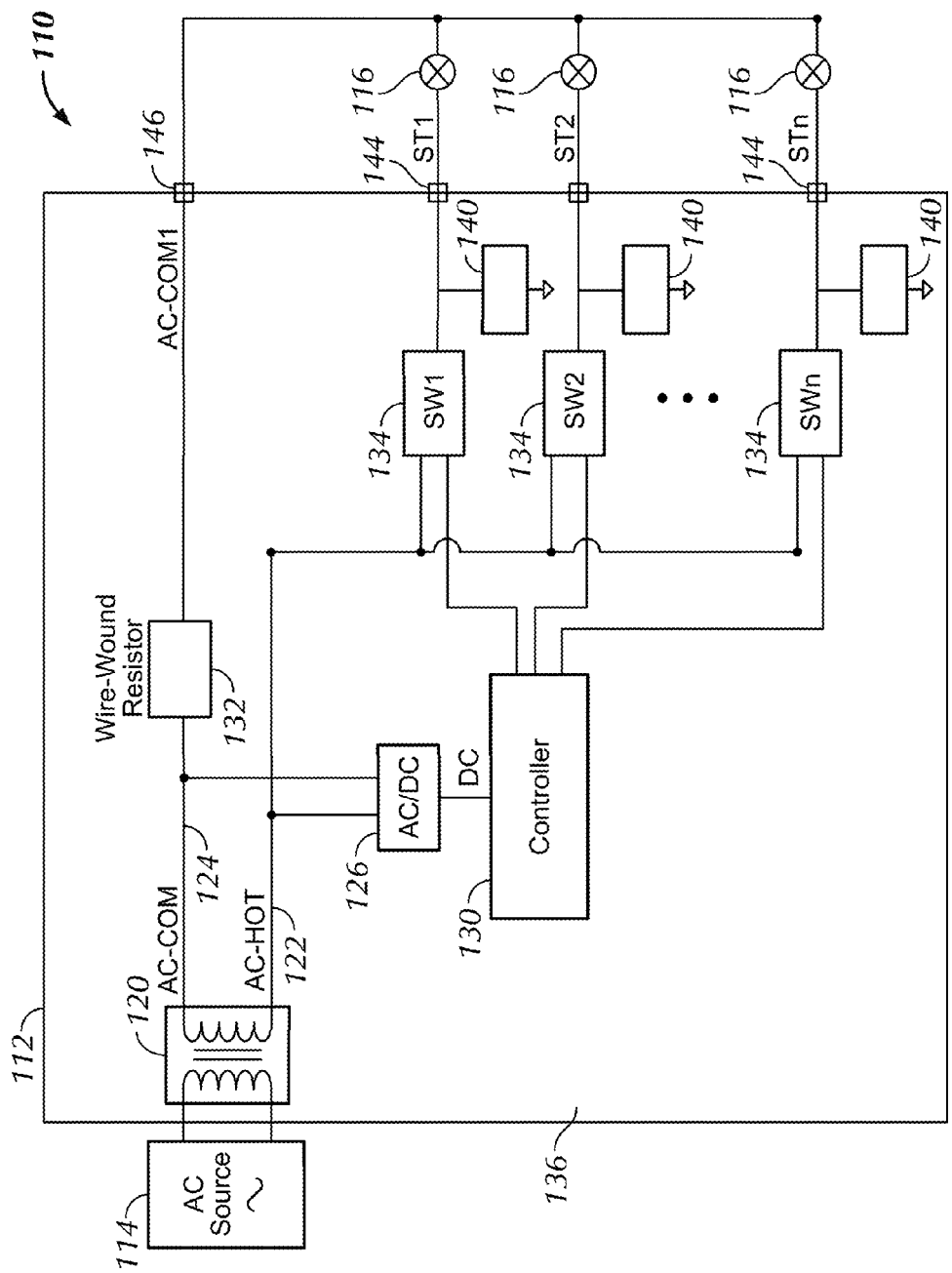
FIG. 1 shows a simplified block diagram of an exemplary irrigation system, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 shows a simplified block diagram of an exemplary irrigation system 110, in accordance with some embodiments. The irrigation system 110 includes an irrigation controller 112 coupled with an external alternating current (AC) power source 114, and valve solenoids 116. The irrigation controller 112 couples with and controls the one or more valve solenoids 116, which open and close one or more corresponding valves, in implementing irrigation to distribute water to one or more water distributing devices (e.g., sprinklers, drip lines, etc.) that dispense water to plant life proximate the water distributing devices. In some embodiments, the irrigation controller 112 includes a transformer 120 or coupled with an external transformer, an alternating current (AC) to direct current (DC) converter 126, a controller or microcontroller 130, an impedance element 132 comprising an inductive reactance, a plurality of AC switching devices or AC switches 134, and in some embodiments a backplane 136 providing power lines and/or communication paths between components of the irrigation controller. The transformer 120 includes primary inputs coupled with the external AC power source 114, and secondary outputs coupled with a live AC line 122 (some times referred to as AC-HOT) and a AC common line 124 (some times referred to as an AC-Common or AC-COM). Again, the transforming can be internal to the irrigation controller or external to the controller. Some embodiments further include one or more additional overvoltage protection circuitry and/or devices 140.

The transformer 120 is configured to step down a voltage of an input AC signal from the external AC power source 114 to produce a transformed AC signal or AC power signal having a voltage that is usable by the components of the irrigation controller. For example, in some embodiments, the transformer 120 receives, on the primary inputs, 240 VAC and steps the voltage down to 24 VAC across the secondary outputs (i.e., live AC secondary terminal coupled with the live AC line 122 and AC common secondary terminal coupled with the AC common line 124). Those skilled in the art will appreciate that other input and output AC signals and/or voltage levels can be received and stepped down or up through the transformer 120. The AC/DC converter 126 couples with the live AC line 122 and the AC common line 124, and further couples with the controller 130. The controller 130 receives DC power converted from the AC/DC converter 126. Again, the DC voltage/s that can be generated through the AC/DC converter can be substantially any relevant voltage/s that can be utilized by the controller 130 and/or other components of the irrigation controller 112 that utilize a DC voltage. For example, the DC voltage may be 3 VDC, 5 VDC and/or other relevant voltages.

The controller 130 further couples with each of the AC switches 134 to provide control signals to the AC switches to control the opening and closing of the AC switches to allow the AC power signal to pass to the solenoids 116. The controller 130 can be implemented through one or more microcontrollers, processors, microprocessors, ASIC/s, central processing unit, logic, local digital storage, firmware and/or other control hardware and/or software. In some embodiments, the controller 130 is part of a control panel of an irrigation controller. The control panel typically is mounted within an irrigation controller housing and includes a user interface that allows a user to interact with the irrigation controller (e.g., including buttons, rotary dial, a display, LEDs, etc.). The irrigation controller is configured to implement an irrigation schedule stored at the irrigation controller and/or irrigation commands received at the irrigation controller.

The AC switches 134 further couple with the live AC line 122 to receive the AC power signal. In response to the control signals from the controller 130, the AC switches open to allow the transformed AC power signal to pass to the one or more station terminals 144. The valve solenoids 116 are electrically coupled with the station terminals 144 to receive the AC power signal activating the valve solenoids that in turn open the corresponding valve/s, or the AC switches close to interrupt the AC power signal to the valve solenoids to close the corresponding valve/s. The additional protection devices 140 operate to provide protection at least for the AC switches 134. In some embodiments, the additional protection devices 140 can include devices that provide shunting of overvoltage and/or power surges. For example, the protection device 140 can be but is not limited to a varistor (e.g., metal-oxide varistor (MOV)), gas discharge tube (GDT), or other such device or combination of such devices.

In some embodiments, the AC common line 124 established a reference ground for the irrigation system 110. The valve solenoids 116, in at least some embodiments, are further coupled back to a reference AC common and/or the reference ground of the irrigation system. For example, the valve solenoids 116 further couple back through a common discharge node (CDN) terminal 146 to the reference AC common and/or a reference ground. In some implementations, the CDN is isolated from the AC common line and the earth ground with a spark gap or the like.

Further, in some embodiments, the impedance element 132 comprises an inductive reactance and a resistive component. The impedance element is coupled in series on the AC common line 124. As such, the impedance element is functionally coupled between the transformer 120 and the valve solenoids 116. The impedance element increases the source output impedance of the transformer 120 in the AC common line return path. In some embodiments, the impedance element 132 is implemented through one or more resistors coupled in parallel with one or more inductors. In other embodiments, the impedance element comprises one or more wirewound resistors. For example, a wirewound resistor is coupled in series with the transformer 120 on the AC common line 124. Further, the wirewound resistor is typically a wirewound resistor that does not include compensation for the inductive effects of the wound construction (sometimes referred to as a non-compensated, wirewound resistor). Typically, the resistance is a relatively low resistance. For example, with wirewound resistors, a resistance of less than about 10Ω is typically used and often less than 5Ω. As one example, the wirewound resistor can be a 1.0Ω wirewound resistor from Yageo Corporation (e.g., SQP500JP-1R0, 1.0Ω 5 W 5% wirewound resistor).

Further, in at least some embodiments, the impedance element 132 coupled serially on the AC common line 124 improves and/or increases overvoltage protection and/or surge voltage protection of at least the AC switches 134. Similarly, the impedance element 132 increases an effective tolerance to overvoltage conditions and/or surge voltages and/or currents at the AC switches and/or other components of the irrigation controller.

With this improved protection provided while the impedance element 132 is serially coupled with the AC common line 124, some embodiments utilize lower rated components (e.g., lower rated AC switching devices) that are rated to operate at lower conditions, such as lower operating currents and/or voltages, than devices that would otherwise typically be included in irrigation controllers when the impedance element 132 is not coupled to the AC common line 124. Again, because of the additional protection provided by the impedance element 132, lower rated AC switches can be utilized while still achieving a level of protection for at least the AC switches that was achieved with previous systems that needed switching devices with significantly higher rated operating conditions. For example, the irrigation system 110 can be assembled, in some embodiments, with AC switches 134 that have lower wattage, voltage and/or current ratings (and in some instances, lower tolerances to voltage and/or current surges and/or overvoltage conditions) while the tolerance to overvoltage and/or surges of the irrigation system 110 continue to provide at least a threshold level of protection that was only achieved in other irrigation systems by using higher rated component and/or a greater numbers of additional protection components in order to achieve the same level of protection. Additionally, the use of these lower rated components can result in decreased costs to the components and/or decreases costs in assembly of the irrigation system 110.

Some embodiments additionally or alternatively utilize AC switches 134 in the irrigation system 110 that include integrated protection circuitry that provide some additional internal overvoltage and/or surge protection for the AC switches. In some embodiments, the AC switches are configured with additional internal protections that are not included in other similar devices that allow for AC switching, such as in TRIACs. For example, in some embodiments, one or more of the AC switches are constructed on an integrated circuit that effectively provides an electrical functionality and/or characteristics within the single integrated AC switch device of an operational amplifier driving a TRIAC that selectively allows the transformed AC power signal to pass. In some embodiments, the operational amplifier at least in part reduces sensitivity and/or complexity of the timing of AC voltages relative to the sinusoidal wave through the AC switch. Additionally, in some implementations, the AC switches 134 have built-in overvoltage protection schemes providing improved performance over previously used TRIACs.

Additionally or alternatively, the integrated circuit of the AC switch 134 can include additional protection circuitry. For example, in some embodiments, one or more of the AC switches 134 include integrated circuitry forming a crowbar protection circuit and/or circuitry that provides the electrical characteristics of a crowbar protection circuit, which in some instances can provide a low resistance path or short circuit when a voltage surge, overvoltage and/or voltage condition occurs that exceeds a threshold and/or tolerance rating. In some embodiments, the AC switches are implemented with AC switches from STMicroelectronics, such as the ACS108 AC switch. Because of the additional internal protection circuitry and/or protections provided through the AC switches 134, and/or the protection provide in cooperation with the serially coupled impedance element 132, the AC switches 134 can have lower ratings of operating conditions (such as lower operating currents and/or voltage conditions) while still achieving a threshold level of protection, than would otherwise be needed in other systems that do not include the impedance element 132 and/or the enhanced AC switches 134 that provide the additional internal protection circuitry.

Additionally or alternatively, the irrigation system 110 can be assembled with a reduced number of additional protection devices 140 cooperated with and external to the plurality of AC switches 134 than would have otherwise been required in order to achieve at least the same threshold level of tolerance to overvoltage and/or voltage/power surge conditions. With integrated overvoltage protection against random transients provided by the AC switches, the AC switches can be a lower rated switch than otherwise would be utilized and/or fewer external protection devices 140 (e.g., external MOV) are utilized while still achieving a predefined tolerance and/or rating to overvoltage and/or surges (e.g., complying with IEC 61000-4-4 and 4-5 standards).

Further, the implementation of the AC switches 134 into an integrated circuit reduces the drive current to activate the AC switches compared to other devices that allow switching of AC signals. For example, some other types of devices that allow for AC switching need 1 A or more to drive and activate the device. Alternatively, in some embodiments, the AC switches 134 can be directly driven by the controller 130 or a microcontroller, reducing the complexity of the system, the number of components of the system and the cost of the system, while simplifying the assembly.

Figure 2:
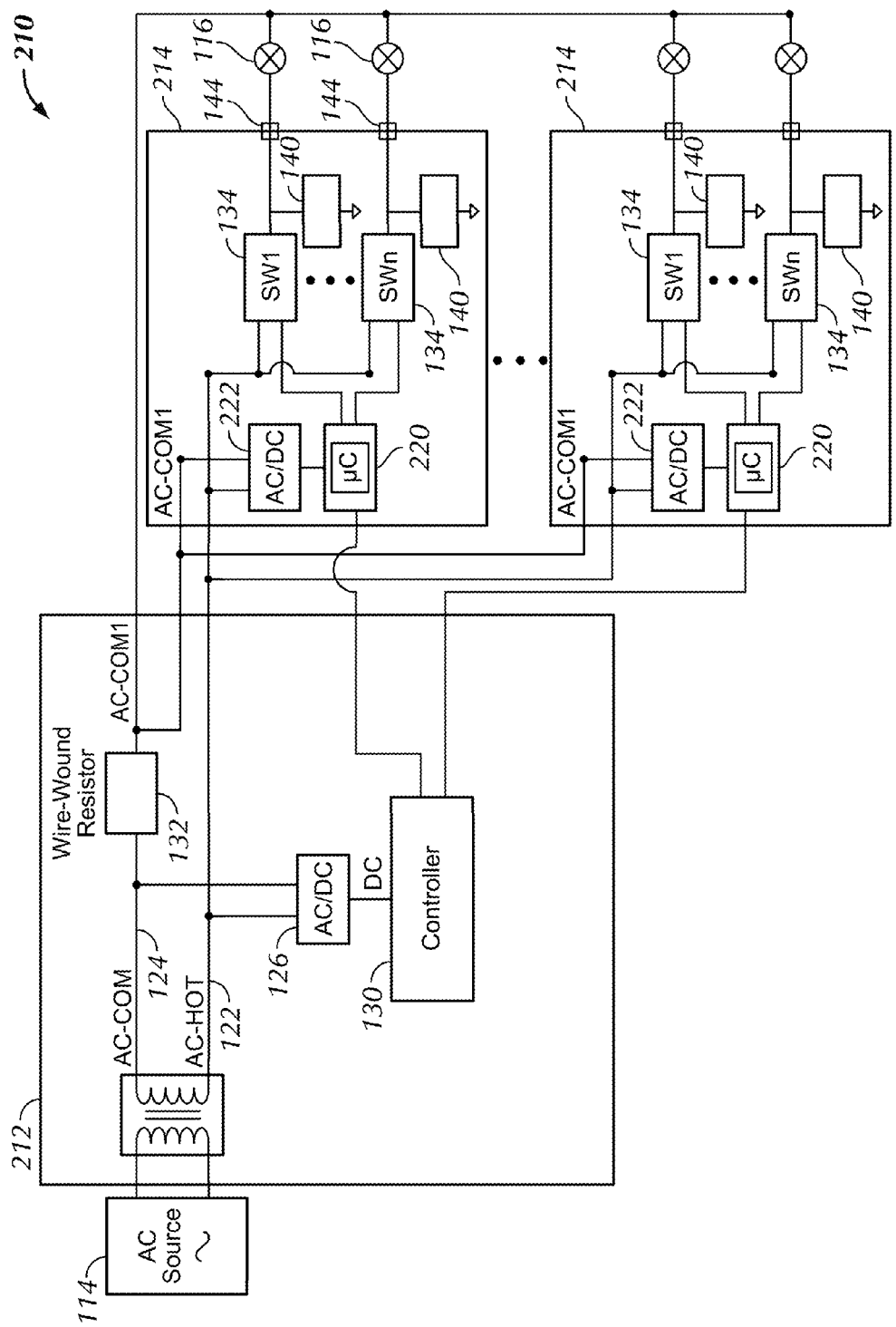
FIG. 2 shows a simplified block diagram of an exemplary irrigation system, in accordance with some embodiments.

FIG. 2 shows a simplified block diagram of an exemplary irrigation system 210, in accordance with some embodiments. The irrigation system 210 includes an irrigation controller 212, one or more station modules 214 and one or more valve solenoids 116. The irrigation controller 212 couples with an external alternating current (AC) power source 114. The station modules 214 communicationally cooperate with the irrigation controller 212 and in some instances mount onto a backplane 136 of the irrigation controller 212. The valve solenoids 116 couple with the station modules 214 through one or more station terminals 144. In some embodiments, the station modules 214 couple with the backplane 136 through one or more connectors (not shown) to at least receive communications from the controller 130 (e.g., over a communication bus). Further, the station modules 214 may obtain power from the transformer 120.

In some embodiments, the irrigation controller 212 includes a transformer 120, a live AC line 122 (some times referred to as AC-HOT), a AC common line 124 (some times referred to as an AC-Common or AC-COM), an AC/DC converter 126, a controller or microcontroller 130, an impedance element 132 comprising an inductive reactance and a resistive component, and in some embodiments a backplane 136 providing power lines and/or communication paths between components. The transformer 120 is configured to step down a voltage of an input AC signal from the external AC power source 114 to produce a transformed AC signal (also referred to as an AC power signal). For example, in some embodiments, the transformer 120 receives 240 VAC on the primary inputs and steps the voltage down to 24 VAC across the secondary outputs (i.e., the live AC line and the AC common line). Those skilled in the art will appreciate that other input and output AC signals can be received and generated, respectively, through the transformer 120. The AC/DC converter 126 couples with the live AC line 122 and the AC common line 124, and further couples with the controller 130. The controller 130 receives DC power converted from the AC/DC converter 126. Similarly, the backplane 136 may include at least a portion of the live AC line 122 that connects (e.g., through a connector) with one or more of the station modules 214 to supply power to the station modules.

In some embodiments, one or more of the station modules 214 include a controller or microcontroller 220, a module AC/DC converter 222, and one or more AC switches 134 or other AC switching devices or systems. As described above, in some implementations, the station module 214 receives power from the transformer 120, typically through the backplane 136. The module AC/DC converter 222 connects with the live AC line 122 and the AC common line 124 and derives one or more DC voltages. In some embodiments, the microcontroller 220 couples with the module AC/DC converter 222 to receive DC power. Accordingly, the live AC line 122 and the AC common line 124 effectively extend into the station modules 214. Additionally, in some embodiments, the module AC/DC converter 222 comprises a linear power supply circuitry, which in some implementations establishes a negative 5 VDC between the live AC line 122 and AC common line 124, with the AC common line defining a digital reference ground.

The microcontroller 220 is further communicationally coupled with the controller 130 of the irrigation controller 212. The microcontroller 220 can be implemented through one or more processors, microprocessors, central processing unit, ASIC/s, logic, local digital storage, firmware and/or other control hardware and/or software. In some embodiments, the station module 214 includes one or more connectors (not shown) that mate with one or more corresponding connectors coupled with the backplane 136 of the irrigation controller 212. The connectors provide a communication path between the controller 130 and the microcontroller 220. In some implementations, the station module 214 couples with the live AC line 122 through the connector. In some embodiments, the station module 214 may further couple with the AC common line 124 through the connector or other such coupling, and/or couple with a reference ground of the irrigation controller 212 that is established by the AC common line. Further in some embodiments, the valve solenoids couple back to the common discharge node (CDN) terminal 146 of one of the other station modules, a different module (e.g., a base module), and/or a separate CDN terminal 146 of the irrigation controller 212. In other embodiments, the station module may include a CDN terminal or an AC common line terminal establishing a line return path. Further, some embodiments include an additional inductance along the return path from the solenoids to the reference ground and/or the AC common line.

The station module 214 further includes one or more station terminals 144 allowing the valve solenoids to be coupled with and driven by the AC signal passed through the one or more AC switches 134. In some embodiments, electrically conductive station lines are coupled between the station terminals 144 and the corresponding valve solenoids 116 providing the electrical connection to activate and deactivate the valve solenoids. The valve solenoids 116 further couple back to the reference ground established based on the AC common line through the CDN (e.g., a CDN terminal). The CDN coupling or terminal can be on the station module 214, part of the backplane 136 of the irrigation controller 212 and/or on a different module cooperated with the irrigation controller 212.

The microcontroller 220 further couples with each of the AC switches 134 of the station module 214 to provide control signals to the AC switches to control the AC switches. Typically, these control signals are consistent with instructions and/or control signals received from the controller 130 of the irrigation controller 212. The AC switches 134 further couple with the live AC line 122 to receive the AC power signal. In response to the control signals from the microcontroller 220, the AC switches open to allow the AC power signal to pass to the valve solenoids 116 activating the valve solenoids that in turn open the corresponding valve/s, or the AC switches close to interrupt the AC power signal to the valve solenoids to close the corresponding valve/s.

In some embodiments, the station modules 214 further include one or more additional circuitry and/or devices 140 (e.g., MOV, GDT, etc.). For example, an additional protection device 140 can be coupled between each AC switch 134 and a corresponding valve solenoid providing some shunting protection for power surges, overvoltage events and the like.

Similar to the irrigation system 110 of FIG. 1, the irrigation system 210 includes an impedance element 132 comprising an inductive reactance and a resistive component. The impedance element couples in series on the AC common line 124. The impedance element 132 provides additional protection to at least the AC switches 134 against overvoltages and/or power surges. Additionally or alternatively, the AC switches 134 can include internal protections against overvoltages, voltage surges and/or power surges. For example, one or more of the AC switches 134 can be formed through an integrated circuit with an internal crowbar protection circuit or circuitry that provides the electrical characteristics of a crowbar protection circuit. Similarly, internal circuitry can minimizes sensitivity and/or complexity of the timing of AC voltages relative to the sinusoidal wave through the AC switch. For example, the internal circuitry formed within the integrated circuit of the AC switches can include an operational amplifier that drives a TRIAC.

Because of the improved protection provided by the serial impedance element 132 and/or the AC switches 134, the AC switches can have lower a rating and/or operating parameters (while still achieving desired levels of protection for overvoltages, current surges, voltage surges and/or power surges) than would otherwise be utilized in irrigation systems that do not include the serial impedance element 132 and/or the AC switches 134 with the enhanced internal protections to achieve the same levels of protection. For example, previous station modules often employed TRIACs that were rated at 4 A, while in some implementations of the present embodiments the AC switches 134 have current ratings of less than half that rating. As one example, some embodiments, incorporate AC switches that have a rating of less than 1.5 A, and in some instances a rating of about 800 mA or less. Similarly, the number of additional protection components external to the AC switches can additionally or alternatively be reduced while still achieving the levels of protection that would otherwise be needed. As such, some embodiments reduce the number of additional protection devices external to the AC switches and/or utilize components with reduced operating ratings while continuing to meet threshold levels of protection and/or tolerance to overvoltage, current and/or power surges.

Figure 3:
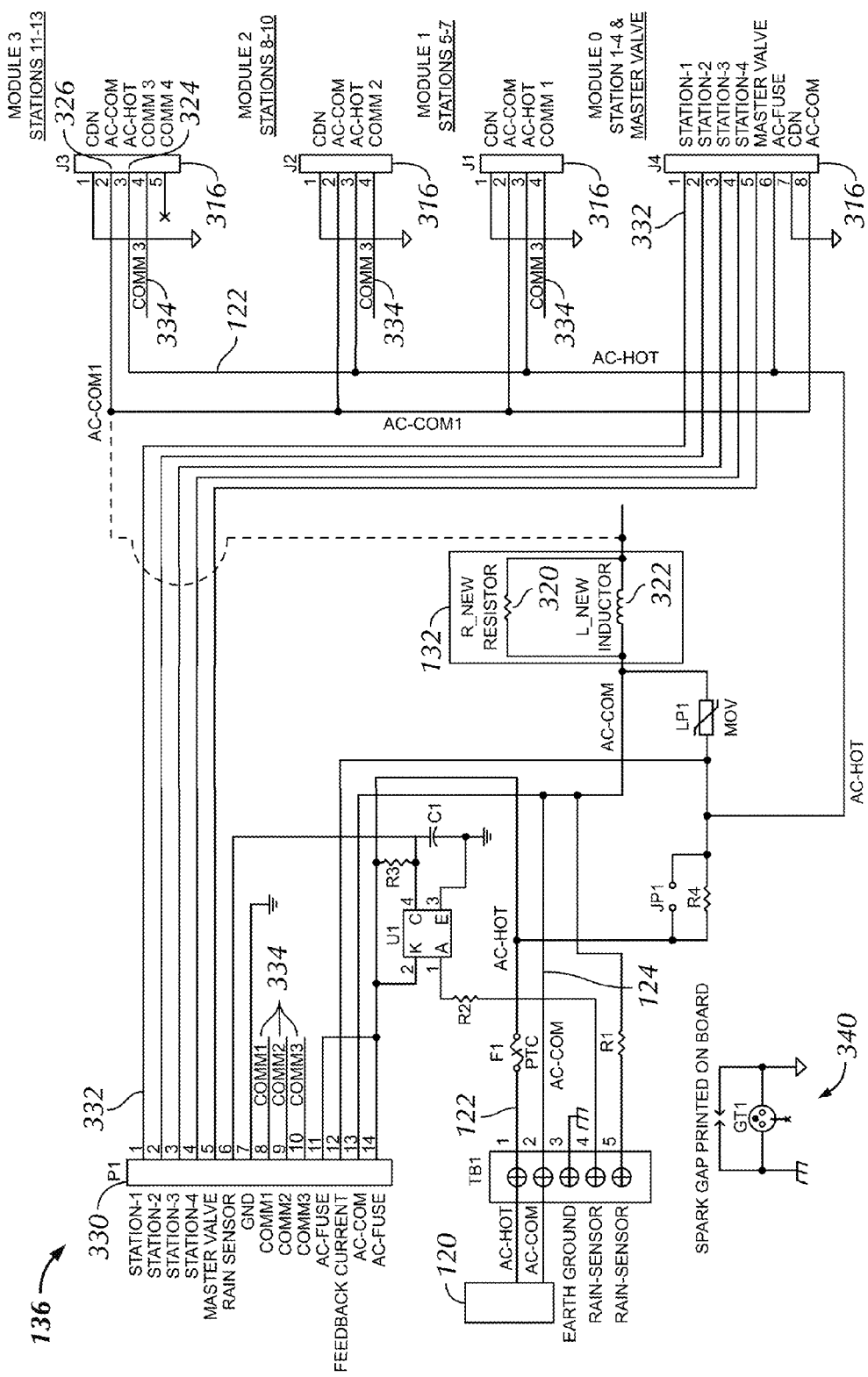
FIG. 3 depicts a simplified schematic diagram of an exemplary backplane of an irrigation controller of FIG. 2, in accordance with some embodiments.

FIG. 3 depicts a simplified schematic diagram of an exemplary backplane 136 of an irrigation controller 212, in accordance with some embodiments. A transformer 120 is coupled with, and typically mounted on the backplane 136.

The backplane 136 includes input ports to couple with an external AC power supply 114 (see FIG. 2) and provide the external AC power to the transformer. The transformer 120 steps down the input voltage providing the AC power signal across the live AC line 122 and the AC common line 124 extending from the secondary terminals of the transformer 120. The live AC line 122 and AC common line 124 extend along the backplane 136 to couple with one or more station module connectors 316 and/or other devices or connectors on the backplane.

The backplane 136, in some embodiments, further includes the impedance element 132 comprising inductive reactance and a resistive component. In the exemplary embodiment depicted in FIG. 3, the impedance element 132 is coupled in series on the AC common line 124. In some implementations, the impedance element 132 comprises an uncompensated wirewound resistor, where the resistor does not include structure and/or characteristics to compensate for at least all of the inductance resulting from the wound structure of the resistor. Additionally or alternatively, in some embodiments, the impedance element 132 comprises one or more resistors 320 coupled in parallel with one or more inductors 322, or one or more other components that functionally provide an impedance having the resistance element and the inductive reactance. As described above, the impedance element 132 is coupled on the AC common line 124 and provides additional protection for at least the AC switches 134. Embodiments may incorporate the impedance element 132 at various locations within the backplane 136. Other embodiments may distribute the impedance element 132 over the backplane, the station modules 214, external to the backplane and/or combinations thereof. For example, some embodiments may incorporate the impedance element 132 into one or more station modules 214.

In some embodiments, the backplane 136 further includes a controller and/or a controller connector 330 that cooperates with the controller 130. The controller connector 330 includes one or more station lines and/or communication connections 332, 334 that extend along the backplane 136 to couple with the station connectors and/or station module connectors 316 to provide control signals to one or more AC switches 134 and/or to the one or more station modules 214 to cause the microcontroller 220 (see FIG. 2) to activate the relevant AC switches to open or close a corresponding valve solenoid 116 in accordance with an irrigation schedule being implemented by the irrigation controller 212. Accordingly, the station module connectors 316, in at least some embodiments, are configured with communication connections as well as live AC line connections 324 and reference AC common connections 326 that are configured to electrically couple with correspond live AC line connections 522 and reference AC common connections 524, respectively, on the station modules 214 (see FIG. 5). In some embodiments, the backplane 136 includes a spark gap 340 (e.g., printed on the circuit board) that in part can minimize voltage variations between a reference ground and an earth ground of the system.

Figure 4:
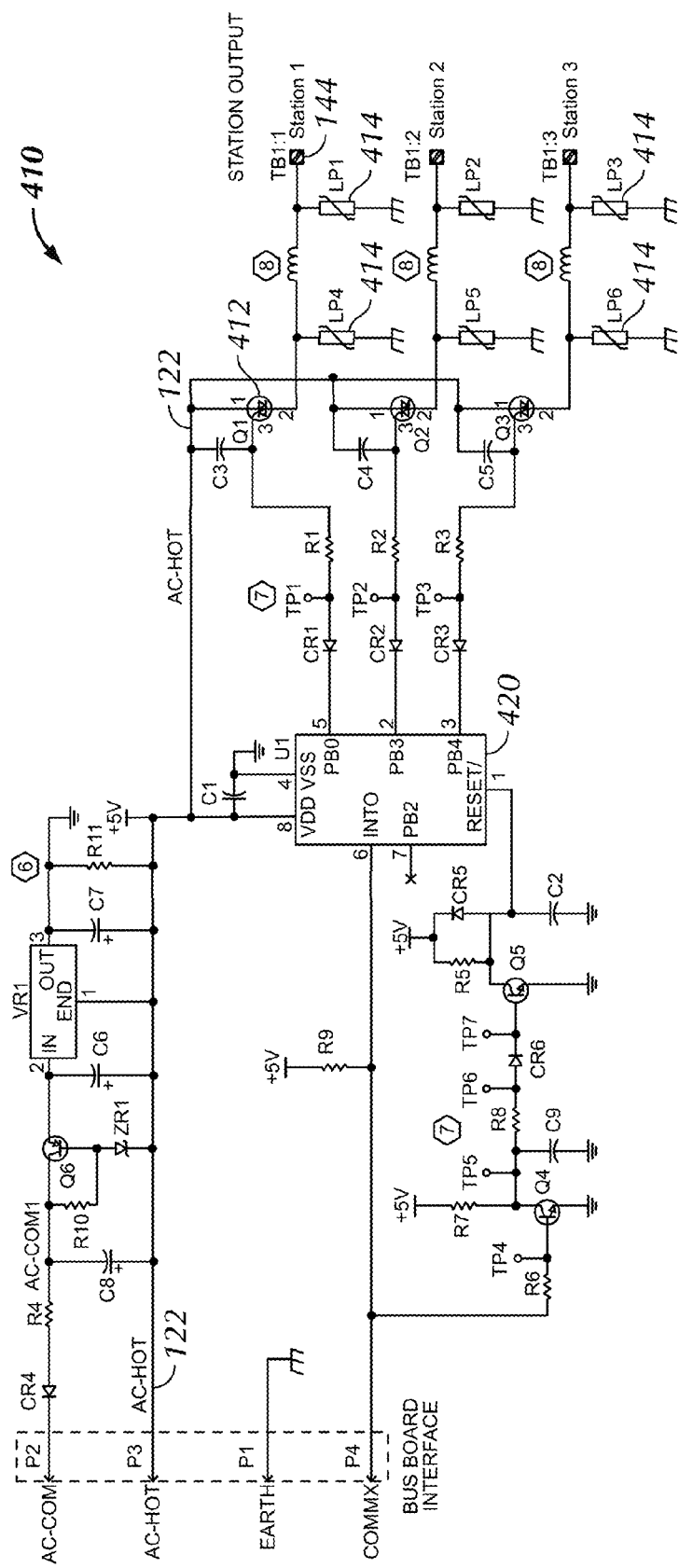
FIG. 4 shows a simplified schematic diagram of an exemplary station module that is configured to cooperate with the backplane of FIG. 3, where the backplane includes an impedance element on the AC common line, in accordance with some embodiments.

FIG. 4 shows a simplified schematic diagram of an exemplary station module 410 that is configured to cooperate with the backplane 136, where the backplane includes the impedance element 132 on the AC common line, in accordance with some embodiments. The station module 410 utilizes typical switching circuitry, such as TRIACs 412 cooperated with additional protection circuitry 414 cooperated with and external to the TRIACs 412. Typically, the TRIACs 412 have a higher operating ratings (e.g., about 4 A $I_T$(RMS)) than the enhanced AC switches 134 that have the internal protection. In some instances, the exemplary station module 410 of FIG. 4 is consistent with existing station modules available through Rain Bird Corporation for use with irrigation controllers and/or timers from Rain Bird Corporation, such as ESP irrigation controller family. In other embodiments, however, the station module 410 is assembled with lower rated component parts because of the additional overvoltage and/or surge protection provided when the station module 410 is coupled with the backplane 136 of an irrigation controller 212 that incorporates the impedance element 132 coupled with the AC common line 124.

The station module 410 includes a microcontroller 420 that triggers activation or deactivation of the TRIACs 412 that allow the AC power signal, carried on the live AC line 122, to be delivered to a respective station terminal 144. Further, the station module 410, in some embodiments, includes multiple additional MOVs 414 or other additional protection devices (e.g., GDT) that are external to and in cooperation with each of the TRIACs 412. The station module 410, however, takes advantage of the impedance element 132 coupled serially on the AC common line 124 (typically on the backplane 136 of the irrigation controller). Accordingly, the station module 410 receives the benefits of the additional overvoltage and/or surge protection provided by the serial impedance element 132. As such, in some embodiments, the station module 410 can be assembled with components that have lower ratings than otherwise would be needed to achieve the same level of protection provided with the inclusion of the impedance element 132. For example, some previous station modules utilize TRIACs as part of the switching system, and these TRIACs typically have a relatively much higher rated operating current than the AC switches 134 implemented in the present embodiments. For example, the some TRIAC used in some station modules are rated for 4 A and/or 600 V. Alternatively, the TRIACs 412 in some embodiments can be rated at less than 2 A, and in some instances less than 1 A. Similarly, some embodiments replace the TRIACs 412 with the AC switches 134 that are rated at less 2 A, for example rated at 1 A and/or 800 V (e.g., the ACS108 from STMicroelectronics rated at 800 mA and 800 V). Further, in some embodiments, the solenoids couple back with another module (e.g., a base or zero module) or the backplane 136 that provides the CDN connection providing a return path to a reference ground, while in other embodiments a module 410 may include a CDN connection.

Figure 5:
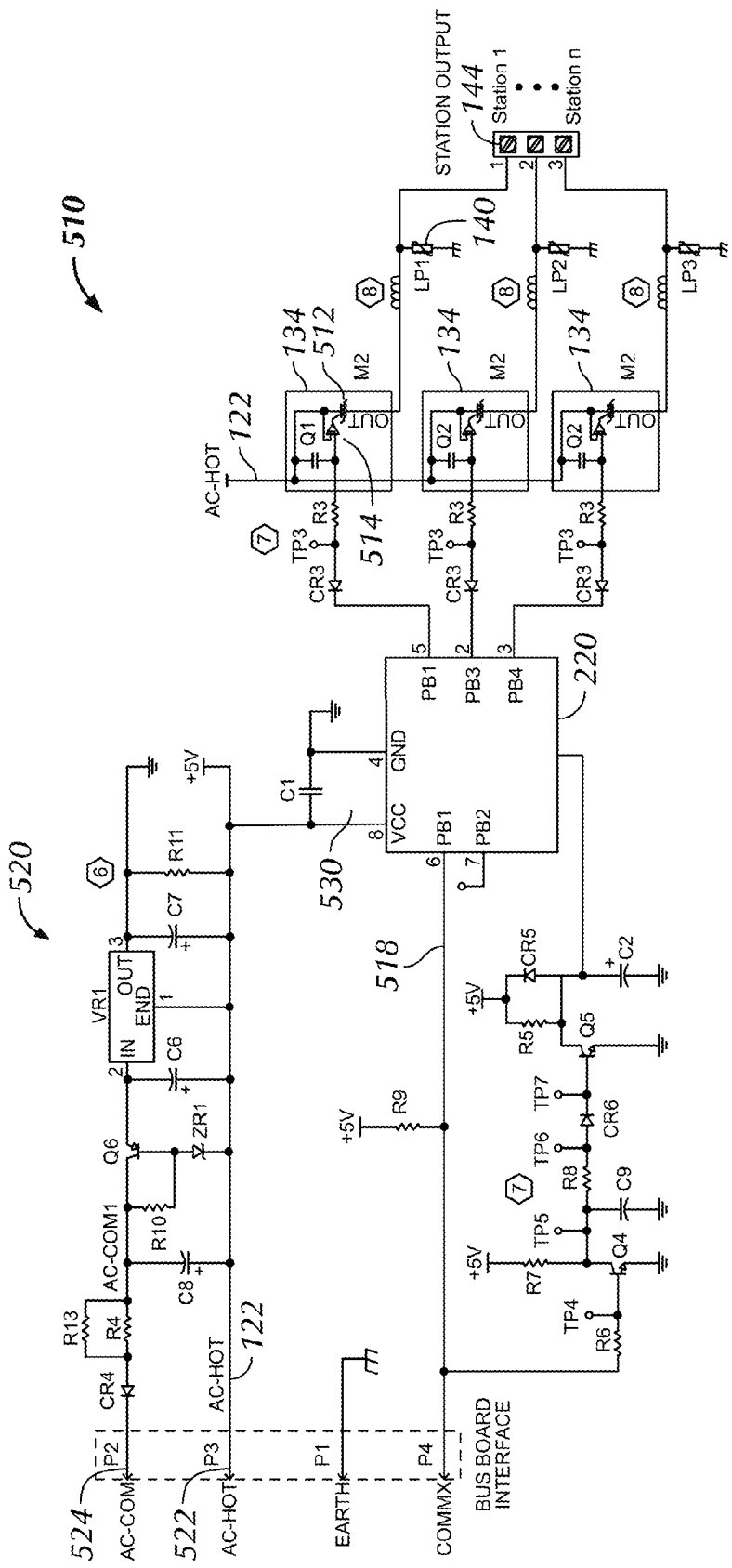
FIG. 5 shows a simplified schematic diagram of an exemplary station module that cooperates with an irrigation controller of FIG. 2 and/or backplane of FIG. 3, in accordance with some embodiments.

FIG. 5 shows a simplified schematic diagram of an exemplary station module 510 that cooperates with an irrigation controller 212 and/or backplane 136 of FIG. 3, in accordance with some embodiments. As described above, the station module 510 includes a live AC line connection 522 and a reference AC common connection 524 that connects with the corresponding live AC line connection 324 and reference AC common connection 326, respectively, of the station module connector 316 on the backplane 136 of the irrigation controller 212. The live AC line 122 and a reference AC common 124 extend from the live AC line connection 522 and the reference AC common connection 524, respectively.

A DC reference voltage 530 is applied at the microcontroller 220 (e.g., across positive DC reference (VDD) and negative DC reference (VSS) pins), which in some embodiments is established between the live AC line 122 and the reference AC common, with the reference AC common defining a digital reference ground. For example, the station module 510 can include a linear power supply circuitry 520, which in some implementations establishes a negative 5

VDC. Further, the microcontroller 220 receives communications (e.g., serial communications) from the controller 130 of the irrigation controller 212 over a communication line 518 that couples with the station lines and/or communication connections 332, 334 of the backplane 136. The microcontroller 220 is further coupled with the AC switches 134 to provide control signals to the AC switches in accordance with instructions and/or commands from the controller 130. As described above, the AC switches 134, in some embodiments, have lower drive currents and can be directly driven by the microcontroller 220 without intermediate drive circuitry.

The AC switches 134 couple with the live AC line 122 and pass the AC power signal through the AC switch to the station terminals 144. The one or more valve solenoids 116 (see FIG. 2) couple with the station terminals 144. As such, when the AC switches are opened the valve solenoids receive the AC power signal, which in some implementations activates the valve solenoids that in turn open the corresponding valve/s. Similarly, when the AC switches close and the valve solenoids no longer receive the AC power signal and close the corresponding valve/s. Further, in some embodiments, the solenoids couple back with another module (e.g., a base or zero module) or the backplane 136 that provides the CDN connection providing a return path to a reference ground, while in other embodiments a module 510 may include a CDN connection.

As described above, in some embodiments, the AC switches 134 are configured with enhanced internal protections. Some exemplary AC switches comprise an integrated circuit providing the electrical functionality and/or characteristics within the single AC switch device of an operational amplifier 514 driving a TRIAC 512 that selectively allows the AC power signal to pass. Some embodiments further include additional integrated protection circuitry, such as but not limited to a crowbar protection circuit and/or other such protection circuitry and/or components. One or more additional protection components 140 can be cooperated with the AC switches 134 (e.g., MOV, GDT, etc.). As described above, because of the additional protection provided by the impedance element 132 and/or the AC switches 134, the AC switches 134 can have lower ratings than would otherwise be utilized while still achieving overall levels of protection for at least the AC switches 134. Additionally or alternatively, fewer additional components 140 and/or components with lower ratings can be utilized in cooperation with the AC switches 134, which can significantly reduce cost and complexity, as well as simplify manufacturing and reduce the cost of manufacturing.

FIG. 6 shows a table presenting representative test results of tolerances to 20 rapidly repeated voltage surges applied to a switching device of an irrigation controller 112, 212, in accordance with some embodiments. The test was applied to two different station modules similar to the station module 410 of FIG. 4 that does not include the lower rated AC switch 134, but instead uses different TRIACs 412 as the basic switching device with a rating of 4 A/600V. The station modules further utilized additional protection devices (e.g., two MOVs or GDTs) external to the TRIAC 412 as a protection clamping device. In a first test, with ground referenced to the AC common line 124, both the first and second station modules maintained levels of tolerance to a series of 20 pulses at 2 KV for both the "on" state (i.e., corresponding TRIAC open) and the "off" state (i.e., the TRIAC closed). In the second test, the impedance element 132 having the inductive reactance and a resistive component is added to the AC common line 124 with ground referenced to the AC common line 124. As shown, both the first and second station modules achieved significant improvements in threshold tolerances to repeated voltage surges, where the first station module achieved a tolerance level of 6 KV (an 300% increase), and the second station module achieved a tolerance level of 8 KV (a 400% increase).

In a third test, without the impedance element 132 coupled to the AC common line 124 and while the reference is to the ground (GND), the first station module has a tolerance level of repeated voltage surges of 4 KV, and the second station module has a tolerance level of 5 KV. In the fourth test, where the impedance element 132 is coupled to the AC common line 124 and while referenced to the ground (GND), both the first and second station modules achieved an improved tolerance. In the example in FIG. 6, the first station module had an increased tolerance level to 5 KV, and the second station module had an increased tolerance level to 8 KV. Accordingly, the incorporation of the impedance element 132 comprising the inductive reactance and a resistive component improved the tolerance by at least 120%, and in some instances as much as 400%.

FIG. 7 shows a table presenting representative test results of tolerances to 20 rapidly repeated voltage surges to station modules that incorporate the lower rated AC switches 134, in accordance with some embodiments. Further, the tests are applied without the impedance element 132 being coupled with the AC common line, and with the impedance element 132 coupled with the AC common line. Again, two station modules were tested.

In a first test, referenced to the AC common line 124, both the first and second station modules achieve tolerance level of about 2.5 KV without the impedance element 132 coupled with the AC common line 124, and achieve the improved tolerance of about 5 KV when the impedance element 132 is coupled with the AC common line.

In a second test, with a output connected to ground, the station module 2 achieves a tolerance level of about 5 KV without the impedance element 132 coupled with the AC common line 124, and achieves the improved tolerance of about 7 KV when the impedance element 132 is coupled with the AC common line. Similarly, the station module 1 achieves a tolerance level of about 4 KV without the impedance element 132 coupled with the AC common line 124, and achieves the improved tolerance of about 6 KV when the impedance element 132 is coupled with the AC common line.

Therefore, again the testing demonstrates that the impedance element 132 and/or the AC switches 134 improve the tolerance level of the system and/or allow for lower rated devices (e.g., lower rated AC switches 134 having a rating of about 800 mA/800V) to be incorporated into the system while still maintaining a desired level of performance and/or tolerance to overvoltages and/or surges. Additionally, the impedance element 132, the AC switch 134 and/or the combination of the impedance element and the AC switch 134 allows for the irrigation controller and/or station modules to be assembled with fewer addition protection devices 140 (e.g., secondary MOV and/or GDT). These surge protection improvements allow the lower wattage components to be implemented in high surge susceptible applications, such as irrigation controllers, which as a result of the long solenoid lines there is a high susceptibility to lightning strikes. Further, the protection provided by the impedance element 132 and/or the AC switches 134 allow the system to comply with overvoltage protection standards (e.g., IEC 61000-4-5 or IEC 61000-4-4 standards) while using lower rated components.

Therefore, significant advantages are achieved through the incorporation of the impedance element 132 coupled with the AC common line 124 and/or the use of the AC switch 134 with enhanced internal protection and/or improved stability. In part, the improved tolerance to overvoltages and/or surges allows the irrigation controller and/or station modules to be assembled using lower rated components while still achieving the desired protection and/or tolerance to overvoltages and/or surges. Further, significant savings can be achieved in part because the costs of the high rated devices are relatively much more expensive than the lower rated devices. Further, the protection provided by the impedance element 132 and/or the AC switch 134 further allow for the reduction in the number and/or rating of additional protection devices, which again reduces the cost.

Still further, the use of the lower rated devices simplifies the assembly of such irrigation controllers 112, 212 and/or station modules 214. For example, the higher rated 4 A TRIAC typically has relatively thick leads, and as such often cannot be mounted within the circuit through a robotic automated process. Instead, these TRIACs often have to be manually mounted and electrically connected, which adds labor costs, reduces throughput and increases a failure rate. Alternatively, the lower rated 800 mA AC switch 134 can be mounted through a robotic automated process, which can reduce labor costs, improve throughput and improve reliability.

The impedance element 132 and/or AC switches 134 can be implemented into numerous types of irrigation controller to provide the additional protection while allowing for the use of lower rated components and/or fewer protection components. For example, the impedance element 132 and/or AC switches 134 can be implemented into irrigation controller from Rain Bird Corporation of Azusa, Calif., such as but not limited to controllers of the ESP irrigation controller family (e.g., ESP-Modular irrigation controller family, ESP-LXME controller family, ESP-RZX controller family, etc.), simple to set irrigation timer (SST) family, and other such irrigation controllers from Rain Bird Corporation and/or other irrigation controllers from other manufacturers. Further, the impedance element 132 and/or AC switches 134 can be incorporated into modular irrigation controllers as well as non-modular irrigation controllers. Additionally, the impedance element 132 can be implemented as a single device or distributed over the backplane 136 and/or station modules 214.

Some embodiments provide irrigation controllers that include the impedance element, having the inductive reactance and a resistive component, coupled with the AC common line, and further include one or more switching systems that include one or more of the plurality of AC switching devices. The irrigation controllers are configured such that there is at least a first threshold tolerance and/or level of protection to repetitive voltage surges, while the irrigation controller has a reduced number of surge protection devices cooperated with and external to the plurality of AC switching devices than would have otherwise been required in order to achieve the first threshold tolerance to the repetitive voltage surges when the impedance element was not coupled in series with the transformer on the AC common line.

In some embodiments, the irrigation controller includes a plurality of switching systems, wherein each of the plurality of switching systems comprises at least one of the AC switches. Each of the plurality of switching circuits in cooperation with the serially coupled impedance element achieves a threshold level of protection and/or tolerance to overvoltage conditions that is about equal to alternative switching systems that each comprise an alternative AC switching device and additional protection circuitry external to the alternate AC switching device that is not needed in the plurality of switching systems in order to achieve the threshold level of protection and/or tolerance to overvoltage conditions.

Further, some embodiments comprise one or more switching systems that comprise one or more of the plurality of AC switches. The switching systems have a first threshold tolerance to repetitive voltage surges, and have a reduced number of surge protection devices cooperated with and external to the plurality of AC switches than would otherwise be utilized in order to maintain the first threshold tolerance to repetitive voltage surges when the impedance element was not coupled in series on the AC common line, functionally between the transformer and the plurality of valve solenoids. Additionally or alternatively, some embodiments include least one less metal-oxide varistor (MOV) protection device cooperated with a respective one of the AC switches than would otherwise be required in order to maintain the first threshold tolerance to repetitive voltage surges when the impedance element was not coupled in series on the AC common line with the transformer.

In some embodiments, the AC switches have a rating corresponding to intended operating conditions that is at least one third less than a rating for other AC switching devices that would otherwise be utilized in order to achieve substantially the same level of tolerance to repetitive voltage surges when the impedance element was not coupled in series on the AC common line.

In some embodiments, the irrigation controller includes the impedance element comprising the inductive reactance and a resistive component. The impedance element is coupled in series on the AC common line with the transformer. The impedance element is configured to increase surges voltage protection between the transformer and the plurality of AC switching devices increasing an effective voltage tolerance by at least 120 percent to overvoltage conditions at the AC switching device.

Further embodiments provide methods of implementing and/or controlling irrigation, comprising: providing, through an irrigation controller, a AC power signal through a transformer; applying the AC power signal though a live AC line from the transformer to an AC switching device; switching the AC power signal through an AC switching device to be applied to one or more valve solenoids in activating one or more valves to distribute water to water distributing devices; and providing additional overvoltage protection to the AC switching device comprising applying an impedance element comprising an inductive reactance and a resistive component to an AC common line; wherein the AC switching device has an operating rating that is less than other AC switching devices; wherein the switching device has a first rating corresponding to intended operating parameters of the AC switching devices while a first level of protection for at least the AC switching devices is achieved, wherein the first rating is less than a second rating corresponding to overvoltage protection of another AC switch that would have otherwise been incorporated into the irrigation controller to achieve the first level of protection when the AC switching device are not incorporated.

Still other embodiments provide methods of implementing irrigation, comprising: applying the AC power signal though a live AC line to an AC switching device; and switching the AC power signal through an AC switch to be applied to one or more valve solenoids in activating one or more valves to distribute water to water distributing devices to implement irrigation at a site; providing additional overvoltage protection to the AC switching device comprising incorporating protection circuitry within an integrated circuit forming the AC switching device. In some implementations, providing the additional overvoltage protection comprises applying an impedance element comprising an inductive reactance and a resistive component in series on an AC common line with the transformer.

While the invention herein disclosed has been described by means of specific embodiments, examples and applications thereof, numerous modifications and variations could be made thereto by those skilled in the art without departing from the scope of the invention set forth in the claims.

What is claimed is:

1. An irrigation controller, comprising:
   a live alternating current (AC) line and an AC common line, wherein the live AC line receives an AC power signal, defined across the live AC line and the AC common line, having a voltage usable within the irrigation controller;
   a plurality of AC switching devices coupled with the live AC line, wherein the plurality of AC switching devices are configured to selectively pass the AC power signal to one or more valve solenoids to control irrigation valves such that the one or more valve solenoids are effectively coupled across the live AC line and the AC common line;
   an impedance element coupled serially between the AC common line of a transformer and a first terminal configured to receive a return of the AC power signal from the one or more valve solenoids, wherein the impedance element comprises an inductive reactance and a resistive component, and the impedance element is configured to increase overvoltage protection of at least the plurality of AC switching devices thereby increasing an effective voltage tolerance to the overvoltage conditions at the plurality of AC switching devices, wherein the overvoltage conditions are sourced between the first terminal and one or more station terminals coupled to the one or more valve solenoids, and wherein the one or more valve solenoids are configured to receive the AC power signal from the plurality of AC switching devices through the one or more station terminals; and
   a controller configured to selectively control the plurality of AC switching devices in selectively allowing the AC power signal to pass through one or more of the AC switching devices to power the respective one or more valve solenoids;
   wherein the plurality of AC switching devices have at least a first rating, corresponding to operating conditions of the AC switching devices, while a first level of protection to overvoltage conditions is obtained for at least the AC switching devices with at least in part the plurality of AC switching devices in cooperation with the impedance element coupled with the AC common line, wherein the first rating is less than a second rating corresponding to operating conditions of other AC switching devices that would have otherwise been incorporated into the irrigation controller when the impedance element was not coupled with the AC common line to achieve substantially a second level of protection to overvoltage conditions that is substantially the same as the first level of protection.

2. The irrigation controller of claim 1, wherein a reduced number of protection devices are cooperated with and external to the plurality of AC switching devices than would have otherwise been included in order to achieve the first level of protection to the overvoltage conditions when the impedance element was not coupled in series with the transformer on the AC common line.

3. The irrigation controller of claim 1, further comprising:
   a station module that removably mounts within the irrigation controller, the station module comprises:
   a microcontroller;
   at least one of the plurality of AC switching devices coupled with the microcontroller; and
   the one or more station terminals coupled with the first terminal and cooperated with the at least one of the AC switching devices, wherein the one or more station terminals are configured to electrically couple with at least one of the valve solenoids such that the AC power signal passes through the one or more station terminals when the corresponding at least one of the AC switching devices is active;
   wherein the microcontroller communicationally couples with the controller when the station module is mounted within the irrigation controller, and the microcontroller directly controls the at least one of the plurality of AC switching devices in accordance with commands from the controller.

4. The irrigation controller of claim 3, further comprising:
   the transformer configured to couple with an external alternating current (AC) power source, wherein the transformer is configured to step down a voltage of an input AC signal producing the AC power signal;
   wherein a live AC line couples with a live AC secondary terminal of the transformer, and the AC common line coupled with an AC common secondary terminal of the transformer.

5. The irrigation controller of claim 1, wherein the impedance element comprises a wirewound resistor.

6. The irrigation controller of claim 5, wherein each of the plurality of AC switching devices comprises an integrated circuit providing electrical characteristics of an operational amplifier driving a TRIAC that selectively allows the AC power signal to pass.

7. The irrigation controller of claim 6, wherein the integrated circuit of each of the plurality of AC switching devices is further configured to provide electrical characteristics of a crowbar protection circuit.

8. The irrigation controller of claim 5, further comprising:
   a microcontroller that communicationally couples with and is controlled by the controller, wherein the microcontroller couples with one or more of the plurality of AC switching devices to directly drive the AC switching devices in accordance with commands from the controller.

9. The irrigation controller of claim 1, wherein the AC power signal passing through the impedance element remains an AC waveform.

10. The irrigation controller of claim 1, wherein the impedance element is not part of an AC/DC converter, and wherein the AC power signal passing through the impedance element is not an input to the AC/DC converter.

11. The irrigation controller of claim 9, wherein the impedance element is adapted to increase an effective tolerance to voltage or current surges at the plurality of AC switching devices received at the first terminal or the one or more station terminals coupled to the one or more valve solenoids.

12. An irrigation controller, comprising:

a controller configured to implement and control irrigation at a site;

a plurality of AC switches coupled with a live alternating current (AC) line to receive an AC power signal, wherein the plurality of AC switches are further coupled with the controller and are controlled by the controller, wherein the controller is configured to selectively activate one or more of the plurality of AC switches to pass the AC power signal to one or more valve solenoids and through an impedance element coupled serially between an AC common line of a transformer and a first terminal configured to receive a return of the AC power signal from the one or more valve solenoids to control irrigation valves in implementing the irrigation, wherein the impedance element comprises an inductive reactance and a resistive component, wherein the impedance element being coupled serially between the AC common line of the transformer and the first terminal is configured to increase an effective voltage tolerance to overvoltage conditions at the plurality of AC switches, and wherein the overvoltage conditions are sourced between the first terminal and one or more station terminals coupled to the one or more valve solenoids, the one or more station terminals configured to receive the AC power signal from the plurality of AC switches;

wherein each of the plurality of AC switches comprise integrated protection circuitry that provide some additional internal surge protection for the plurality of AC switches; and wherein the plurality of AC switches have at least a first rating corresponding to intended operating parameters of the plurality of AC switches while a first level of protection to overvoltage conditions for at least the plurality of AC switches is achieved with at least in part the plurality of AC switches in cooperation with the impedance element coupled with the AC common line, wherein the first rating is less than a second rating corresponding to surge protection of other AC switches that would have otherwise been incorporated into the irrigation controller to achieve the first level of protection when the plurality of AC switches are not incorporated.

13. The irrigation controller of claim 12, wherein the AC switches comprise an integrated circuit providing electrical characteristics of an operational amplifier driving a TRIAC that selectively allows the AC power signal to pass.

14. The irrigation controller of claim 13, wherein the integrated circuit of each of the plurality of AC switches is further configured to provide electrical characteristics of a crowbar protection circuit.

15. The irrigation controller of claim 12, wherein each of the plurality of AC switches is directly driven by the controller without an intermediate driving device.

16. The irrigation controller of claim 12, further comprising:

a microcontroller that communicationally couples with and is controlled by the controller, wherein the microcontroller couples with each of the plurality of AC switches to directly control the AC switches in accordance with commands from the controller.

17. The irrigation controller of claim 16, further comprising:

a station module that removably mounts within the irrigation controller, the station module comprises:

the microcontroller; and at least one of the plurality of AC switches coupled with the microcontroller;

wherein the microcontroller communicationally couples with the controller when the station module is mounted within the irrigation controller, and the microcontroller directly controls the at least one of the plurality of AC switches in accordance with commands from the controller.

18. The irrigation controller of claim 12, further comprising:

a live AC line and the AC common line wherein the AC power signal is defined across the live AC line and the AC common line with the AC common line establishing a reference ground, wherein the impedance element is configured to increase overvoltage protection for at least the plurality of AC switches thereby increasing the effective voltage tolerance to the overvoltage conditions at the plurality of AC switches.

19. The irrigation controller of claim 18, wherein the impedance element comprises a wirewound resistor.

* * * * *